United States Patent [19]
Yamauchi et al.

[11] Patent Number: 5,245,600
[45] Date of Patent: Sep. 14, 1993

[54] APPARATUS FOR REPRODUCING FROM A STORAGE MEDIUM INFORMATION CORRESPONDING TO EACH STORED MUSICAL ARRANGEMENT AND FOR MIXING VOICE DATA WITH MUSIC DATA

[75] Inventors: Keiichi Yamauchi; Toshihiko Shimizu; Satomi Sudo, all of Kawagoe, Japan

[73] Assignee: Pioneer Electronic Corporation, Tokyo, Japan

[21] Appl. No.: 724,638

[22] Filed: Jul. 2, 1991

[30] Foreign Application Priority Data

Jul. 6, 1990 [JP] Japan .................. 2-179797

[51] Int. Cl.$^5$ .......................... G11B 7/00; G11B 27/30
[52] U.S. Cl. ........................ 369/49; 358/343
[58] Field of Search ............ 369/32, 33, 48, 49, 369/59; 358/335, 342, 341, 343; 364/419

[56] References Cited

U.S. PATENT DOCUMENTS

| | | | |
|---|---|---|---|
| 4,992,886 | 2/1991 | Klappert | 358/342 |
| 5,046,004 | 9/1991 | Tsumura et al. | 364/419 |
| 5,099,337 | 3/1992 | Cury | 358/335 |
| 5,117,407 | 5/1992 | Vogel | 369/32 |
| 5,131,311 | 7/1992 | Murakami et al. | 358/342 |

FOREIGN PATENT DOCUMENTS 3828519 3/1990 Fed. Rep. of Germany.

*Primary Examiner*—Donald E. McElheny, Jr.
*Attorney, Agent, or Firm*—Sughrue, Mion, Zinn, Macpeak & Seas

[57] ABSTRACT

An information storage medium such as a CD-ROM has a storage area which stores digital audio information including music digital audio information and a plurality of music piece information having mark information for retrieving the accompaniment information, and a digital contents information table including music title information which represents titles of the music piece information with image information or voice sound information. The storage area is divided into a plurality of sections. Some of the sections which precede the other sections in time store the digital contents information table. The other sections store the digital audio information. An apparatus for reproducing information from the information storage medium selectively reads the music piece information based on the mark information.

11 Claims, 14 Drawing Sheets

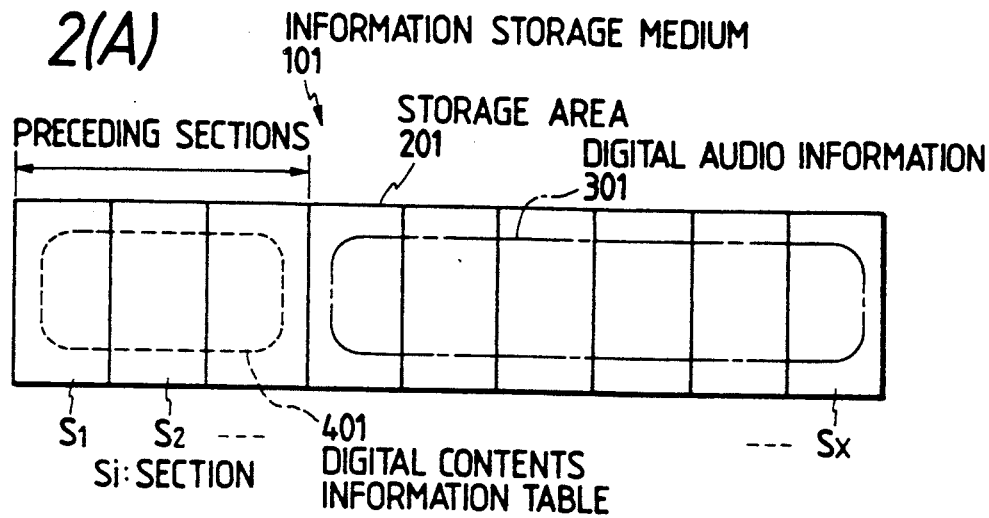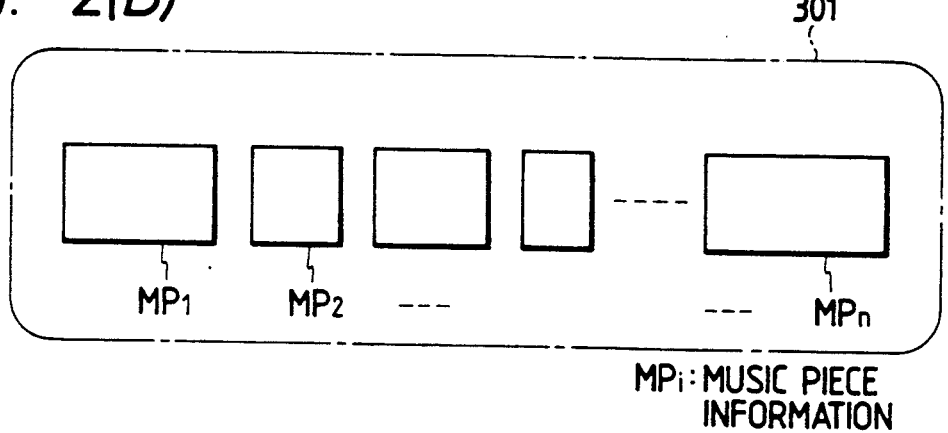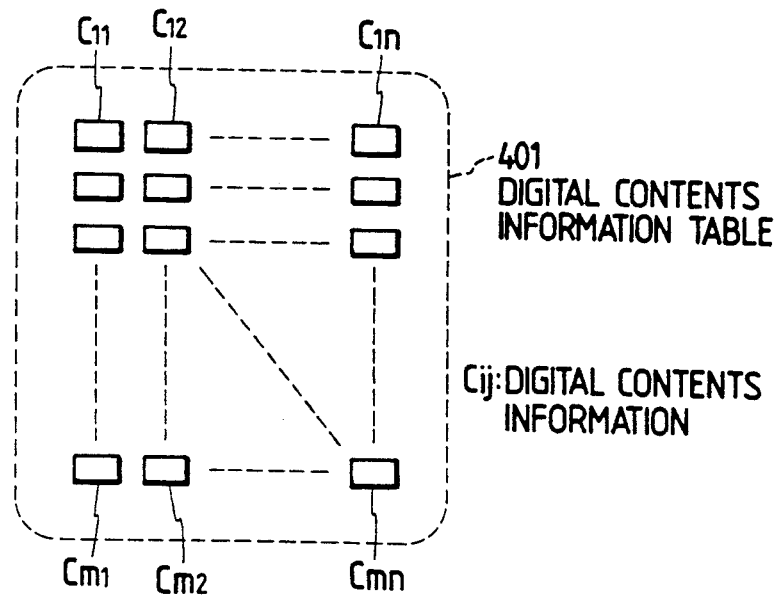

FIG. 7

| | SOUND QUALITY LEVEL | TYPE | SAMPLING FREQUENCY (kHz) | QUANTIZING NUMBER (BIT) | BIT REDUCTION RATIO (STEREO/MONO) | AUDIO CHARACTERISTICS | |
|---|---|---|---|---|---|---|---|
| | | | | | | DYNAMIC RANGE (dB) | FREQUENCY RANGE (kHz) |
| | CD DIGITAL AUDIO (SOUND QUALITY CORRESPONDING TO PRESENT 16-BIT PCM) | PCM | 44.1 | 16 | 1 | 98 | 20 |
| A | HIFI (SOUND QUALITY CORRESPONDING TO LP RECORD) | ADPCM | 37.8 | 8 | 1/2 / 1/4 | 90 | 17 |
| B | MID-HIFI (SOUND QUALITY CORRESPONDING TO FM BROADCAST) | ADPCM | 37.8 | 4 | 1/4 / 1/8 | 90 | 17 |
| C | SPEECH (SOUND QUALITY CORRESPONDING TO AM BROADCAST) | ADPCM | 18.9 | 4 | 1/8 / 1/16 | 50 | 8.5 |

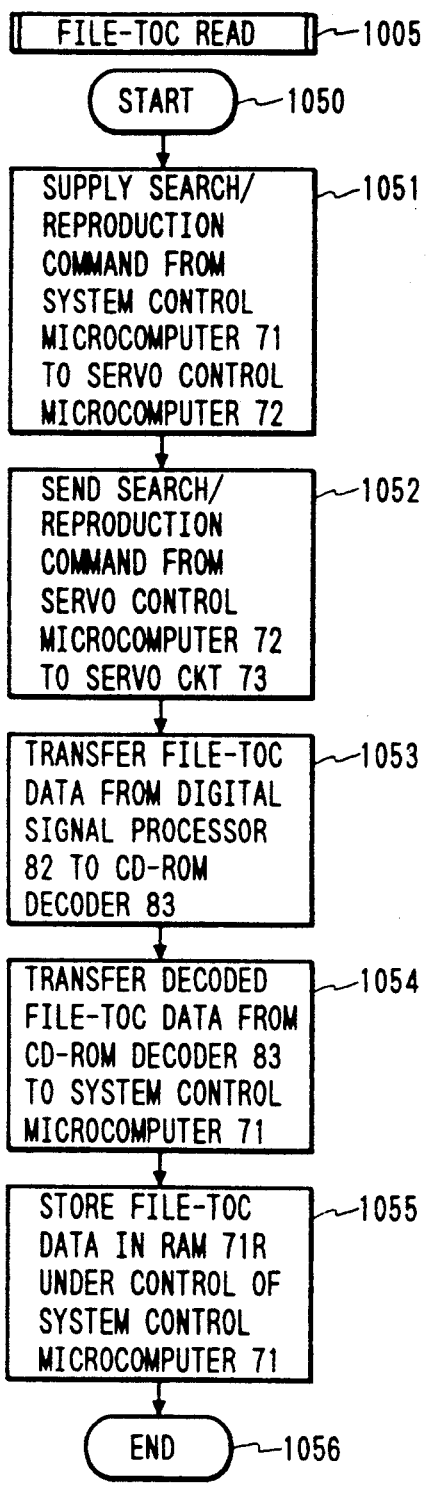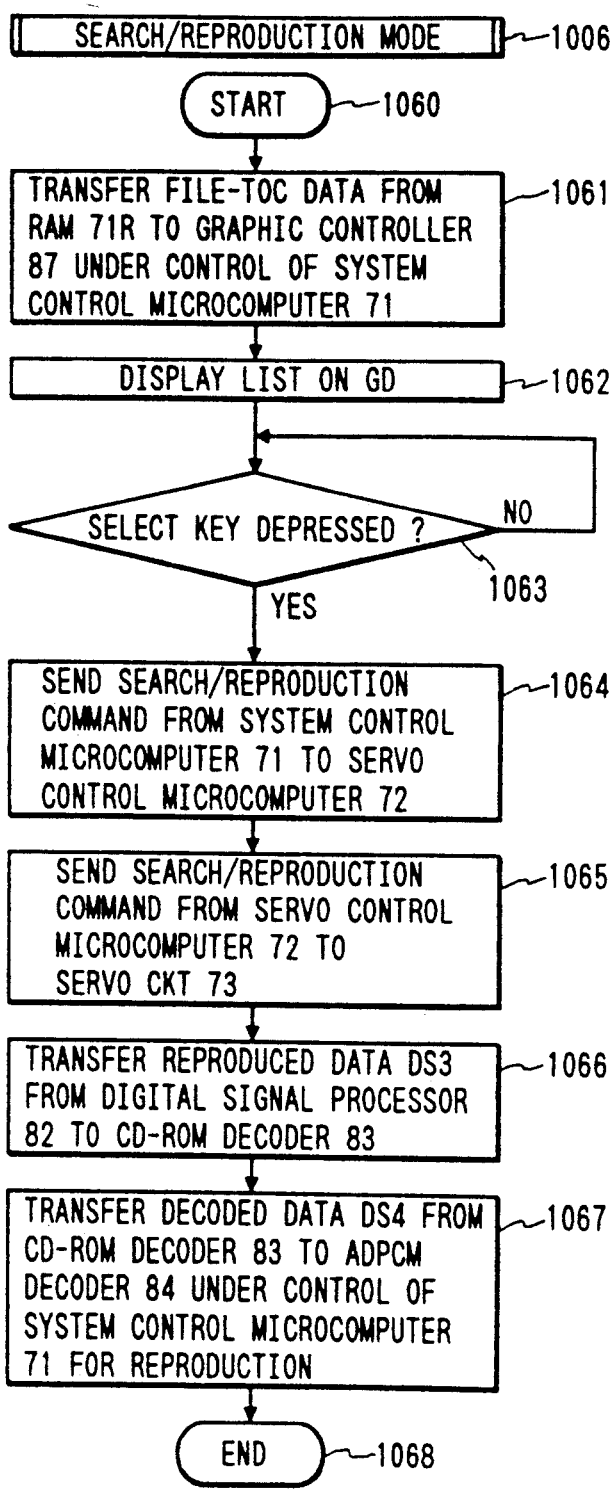

FIG. 11

| MUSIC NUMBER (L1) | MUSIC TITLE (L2) | POET, COMPOSER (L3) | SINGER (L4) | BEGINNING PHRASE (L5) |
|---|---|---|---|---|
| 01 | oooo | oo oo / oo oo | o o oo | ooo oo --- |
| 02 | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| n | ⋮ | ⋮ | ⋮ | ⋮ |

APPARATUS FOR REPRODUCING FROM A STORAGE MEDIUM INFORMATION CORRESPONDING TO EACH STORED MUSICAL ARRANGEMENT AND FOR MIXING VOICE DATA WITH MUSIC DATA

BACKGROUND OF THE INVENTION

The present invention relates to an information storage medium and an apparatus for reproducing information from the information storage medium, and more particularly to an information storage medium suitable for storing musical accompaniments, so-called "karaoke", and an apparatus for reproducing information from the information storage medium.

A conventional apparatus for playing back prerecorded musical accompaniments, or a musical accompaniment playback apparatus, reproduces such prerecorded musical accompaniments by playing back information recording mediums, such as magnetic tapes, video disks, etc., on which only musical accompaniments are recorded. Such a musical accompaniment playback apparatus includes an amplifier connected to a microphone and a loudspeaker, and mixes vocal signals supplied from the microphone with signals of reproduced musical accompaniments, amplifies the mixed signals, and supplies the amplified signals to the loudspeaker to produce audible sounds.

When a user of the musical accompaniment playback apparatus wants to sing a desired song recorded in an information storage medium such as a magnetic tape, a disk, or the like, it is necessary for the user to look for the registered number of the information storage medium and the registered number of the desired music piece in a printed list of music pieces or music titles, to select the information storage medium which stores the desired music piece, load the selected information storage medium into the musical accompaniment apparatus, and select the desired music piece according to the registered number thereof.

Some users may be desirous of using the musical accompaniment playback apparatus in passenger cars. It would be convenient if a desired music piece can be selected even without a list of music titles.

Recently, compact disks (CDs), which are one type of digital audio disks, are used as a recording medium for karaoke music or musical accompaniments. On a CD, pulse-code-modulated musical information is recorded in time-divided storage areas. Code information, referred to as a "subcode", is recorded at the leading end of each of the storage areas. One of the innovative features of the CDs is that any desired music piece recorded on a CD can quickly be selected or accessed by searching the subcodes on the CD at high speed. One storage area, known as "TOC" (Table of Contents) and serving as a table of subcodes for retrieving recorded music pieces, is located on the innermost track of the CD, called "lead-in area", which is read first at the playback. The TOC storage area has a storage capacity of 9 bytes. When a CD is loaded in a CD player, the CD Player reads the data of the TOC on the CD. The user inputs a control command indicative of the subcode corresponding to the leading end of a desired music piece recorded on the CD. Then, the CD player searches for an address having the indicated subcode on the CD, and moves an optical pickup to a radial position on the CD which corresponds to the address. When the optical pickup reaches the addressed position, it starts to reproduce the music information from the address.

The TOC storage area stores code information, rather than music titles, because of the limited storage capacity. Therefore, in order to selectively play back a desired music piece, the user needs a printed list of music titles and code information related to the music titles.

SUMMARY OF THE INVENTION

It is an object of the present invention to provide an information storage medium capable of presenting or outputting information representing the titles or the like of recorded music pieces, and an apparatus for reproducing information from the information storage medium.

According to one aspect of the present invention, there is provided an information storage medium comprising a storage area which stores digital audio information including a plurality of music piece information, and a digital contents information table including a plurality of digital contents information which are related to the contents of said plurality of music piece information, the storage area being divided into a plurality of sections including a first group of sections and a second group of sections, the first group of sections storing the digital contents information table, the second group of sections storing the digital audio information. The first group of sections may precede the second group of sections in time.

According to another aspect of the present invention, there is also provided an information storage medium comprising a storage area which stores digital audio information including a plurality of music piece information, each of said plurality of music piece information having accompaniment information and mark information for retrieving the accompaniment information, and a digital contents information table including a plurality of music title information which represent titles of said plurality of music piece information with image information or voice sound information, the storage area being divided into a plurality of sections including a first group of sections and a second group of sections, the first group of section preceding the second group of sections in time, the first group of sections storing the digital contents information table, the second group of sections storing the digital audio information. The information storage medium may include an optical storage disk according to Adaptive Differential Pulse Code Modulation system.

According to still another aspect of the present invention, the information stored in the information storage medium may be reproduced by an information reproducing apparatus which comprises information reading means for reading information from the information storage medium, and control means for controlling the information reading means to selectively read one of said main information based on the mark information. The information storage medium may include an optical disk according to Adaptive Differential Pulse Code Modulation system. The apparatus may further comprise information display means for displaying said plurality of music title information, command input means means for inputting command to select a desired music title information which corresponds to a desired accompaniment information to be reproduced, accoustoelectric transducer means for transducing voice sound sung in relation to the accompaniment information into electric voice information, and information mixing means for mixing the accompaniment information with the electric voice information. The music title information corresponds to the mark information. The information display means may include a cathode ray tube, or may be unified with the command input means. The unified command input means may include a transparent touch panel type input unit.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2(A) through 2(C) are diagrams illustrating a second embodiment of the present invention, respectively.

FIG. 7 is a diagram showing a table of ADPCM sound quality levels and audio characteristics.

FIGS. 10(A), 10(B), 10(C), and 10(D) are flowcharts of a control program for controlling operation of the musical accompaniment playback apparatus shown in FIG. 9.

FIG. 11 is a diagram showing, by way of example, a displayed image of a list of music pieces to choose from in the musical accompaniment playback apparatus shown in FIG. 9.

DETAILED DESCRIPTION OF THE PREFERRED EMBODIMENTS

First Embodiment

Figure 1A:
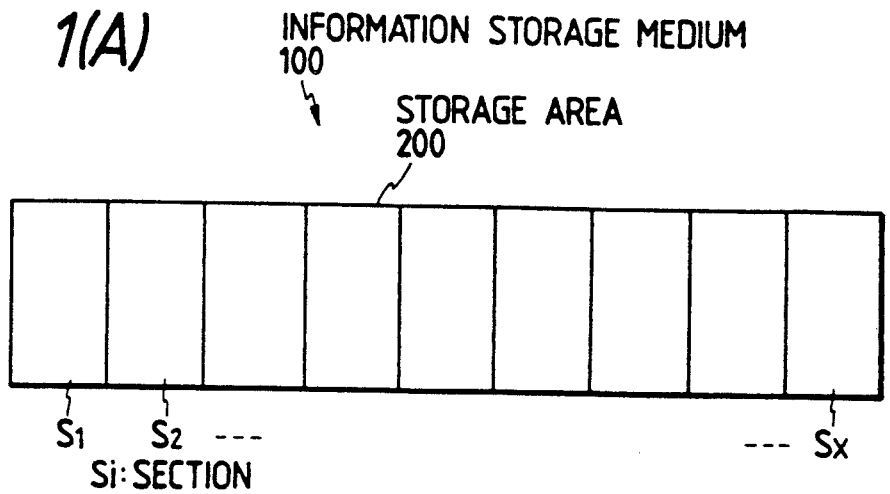
FIG. 1(A) through 1(C) are diagrams illustrating a first embodiment of the present invention, respectively.
Figure 1B:
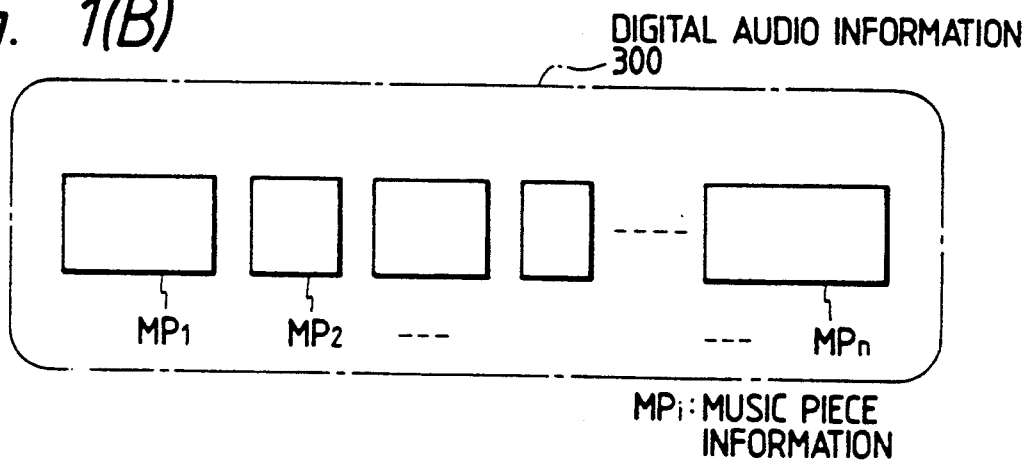
Figure 1C:
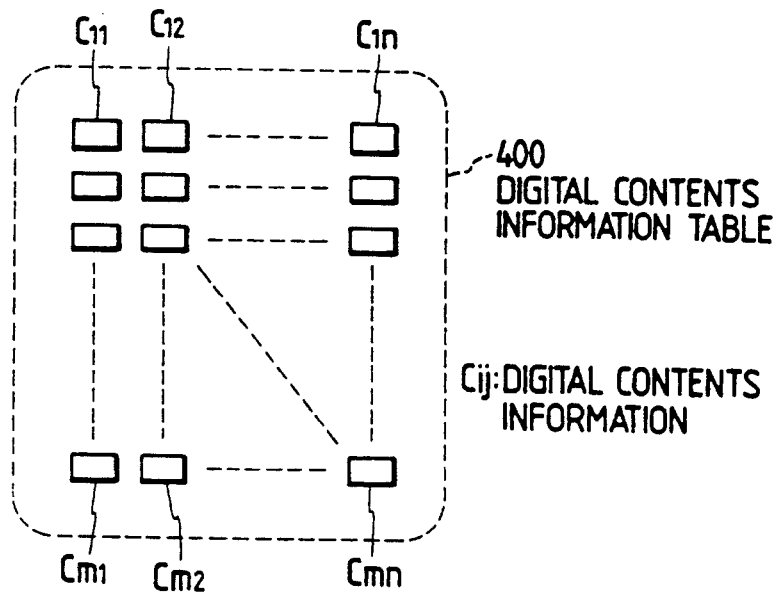

FIG. 1(A) through 1(C) schematically show a first embodiment of the present invention, respectively.

FIG. 1(A) shows an information storage medium 100. The information storage medium 100 has a storage area 200. The storage area 200 is divided into a plurality of sections $S_1$-$S_x$. A first group of the sections $S_1$-$S_x$ stores a digital contents information table 400, and a second group of the sections $S_1$-$S_x$ stores digital audio information 300. The digital audio information 300 contains a plurality of music piece information $MP_1$-$MP_n$, as shown in FIG. 1(B). The digital contents information table 400 contains a plurality of digital contents information $C_{11}$-$C_{mn}$, which are related to the contents of the music piece information $MP_1$-$MP_n$, as shown in FIG. 1(C).

When the information storage medium 100 shown in FIG. 1(A) is played back to reproduce the digital contents information table 400, the digital contents information $C_{11}$-$C_{mn}$ relative to the contents of the music piece information $MP_1$-$MP_n$ contained in the digital audio information 300 are reproduced. For example, the digital contents information $C_{i1}$-$C_{in}$ represent the titles of the music piece information $MP_1$-$MP_n$, that is, the digital contents information $C_{ij}$ represents the title of the music piece information $MP_j$. Thus, the digital contents information $C_{11}$-$C_{mn}$ represent m kinds of information with respect to the music piece information $MP_1$-$MP_n$. Therefore, if the digital contents information $C_{i1}$-$C_{in}$ relative to the titles of the music piece information $MP_1$-$MP_n$ are stored in the form of character code information, for example, the user may output the digital contents information $C_{i1}$-$C_{in}$ as an image on a graphic display unit or the like. As images may be expressed by ordinary characters including Chinese characters, Japanese syllabaries and the alphabet mixed together, or the like, a list of music titles expressed by ordinary characters of the music piece information $MP_1$-$MP_n$ can be displayed on the graphic display unit according to a command entered by the user. Therefore, the user can output and display a list of music titles from the information storage medium 100, and select and play back a desired music piece based on the displayed title list, even without a printed list of the titles of the music pieces.

Second Embodiment

FIG. 2(A) through 2(C) schematically show a second embodiment of the present invention, respectively.

FIG. 2(A) shows an information storage medium 101. The information storage medium 101 has a storage area 201. The storage area 201 is divided into a plurality of sections $S_1$-$S_x$. Some preceding ones of the sections $S_1$-$S_x$ store a digital contents information table 401, and the other following sections store digital audio information 301. The digital audio information 301 contains a plurality of music piece information $MP_1$-$MP_n$, as shown in FIG. 2(B). The digital contents information table 401 contains a plurality of digital contents information $C_{11}$-$C_{mn}$ relative to the contents of the music piece information $MP_1$-$MP_n$, as shown in FIG. 2(C).

When the information storage medium 101 shown in FIG. 1(A) is played back to reproduce the digital contents information table 401, the digital contents information $C_{11}$-$C_{mn}$ relative to the contents of the music piece information $MP_1$-$MP_n$ contained in the digital audio information 301 are reproduced. For example, the digital contents information $C_{i1}$-$C_{in}$ represent the titles of the music piece information $MP_1$-$MP_n$, that is, the digital contents information $C_{ij}$ represents the title of the music piece information $MP_j$. Thus, the digital contents information $C_{11}$-$C_{mn}$ represent m kinds of information with respect to the music piece information $MP_1$-$MP_n$. Therefore, if the digital contents information $C_{i1}$-$C_{in}$ relative to the titles of the music piece information $MP_1$-$MP_n$ are stored in the form of character code information, for example, the user may output the digital contents information $C_{i1}$-$C_{in}$ as an image on a graphic display unit or the like. As images may be expressed by ordinary characters including Chinese characters, Japanese syllabaries and the alphabet mixed together, or the like, a list of music titles expressed by ordinary characters of the music piece information $MP_1$-$MP_n$ can be displayed on the graphic display unit according to a command entered by the user. Therefore, the user can output and display a list of music titles from the information storage medium 101, and select and play back a desired music piece based on the displayed title list, even without a printed list of the titles of the music pieces.

Third Embodiment

Figure 3A:
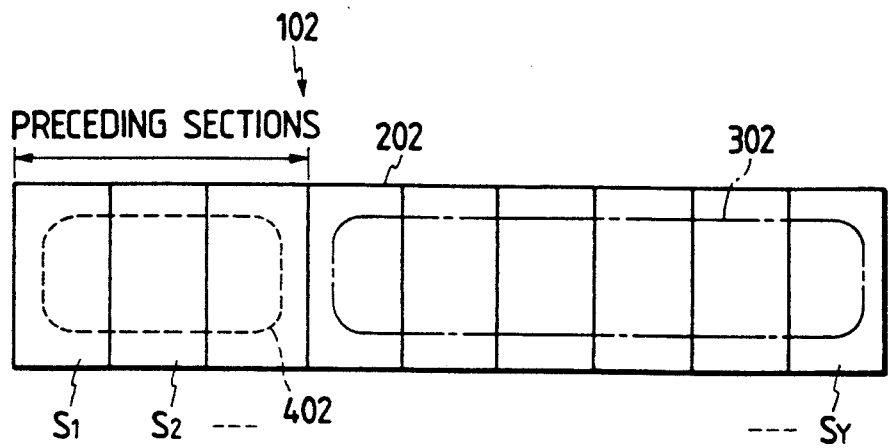
FIG. 3(A) through 3(C) are diagrams illustrating a third embodiment of the present invention, respectively.
Figure 3B:
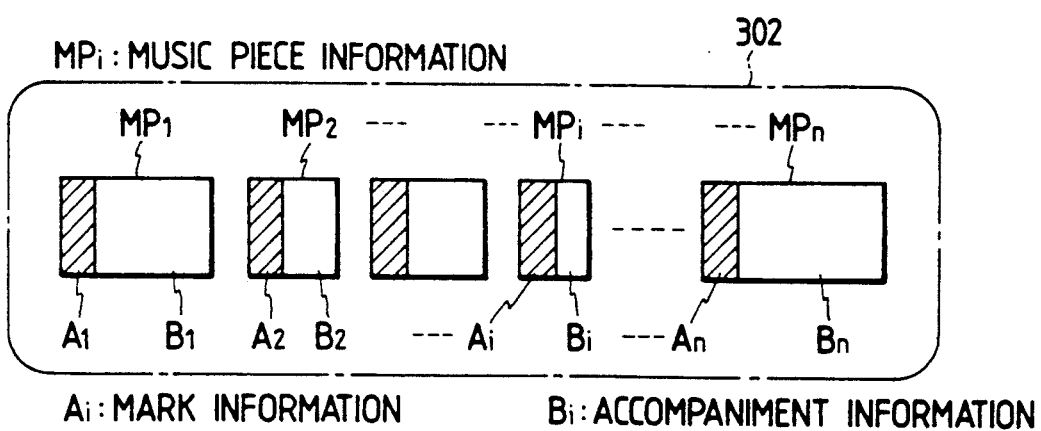
Figure 3C:
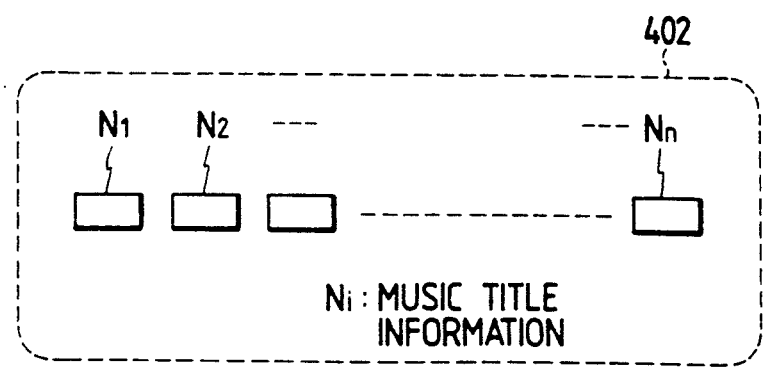

FIG. 3(A) through 3(C) schematically show a third embodiment of the present invention, respectively.

FIG. 3(A) shows another information storage medium 102. The information storage medium 102 has a storage area 202. The storage area 202 is divided into a plurality of sections $S_1$-$S_y$. Some preceding ones of the sections $S_1$-$S_y$ store a digital contents information table 402, and the other following sections store digital audio information 302. The digital audio information 302 contains a plurality of music piece information $MP_1$-$MP_n$, as shown in FIG. 3(B). The music piece information $MP_i$ contains accompaniment information $B_i$ and mark information $A_i$ for retrieving the accompaniment information $B_i$. The digital contents information table 402 contains a plurality of music title information $N_1$-$N_n$ which represent the titles of the music piece information $MP_1$-$MP_n$ with image or voice sound information, as shown in FIG. 3(C).

When the information storage medium 102 shown in FIG. 3(A) is played back to reproduce the digital contents information table 402, the music title information $N_1$-$N_n$ which represent, with image or voice sound information, the titles of the music piece information $MP_1$-$MP_n$ which is stored in the digital audio information 302 are reproduced. The music piece information $MP_i$ has accompaniment information $B_i$ and mark information $A_i$ for retrieving the music piece information $MP_i$. Thus, if the music title information $N_1$-$N_n$ are represented by image information, for example, the user may output the music title information $N_1$-$N_n$ on a graphic display unit or the like. As images may be expressed by ordinary characters including Chinese characters, Japanese syllabaries and the alphabet characters mixed together, or the like, a list of music titles expressed by ordinary characters of the music piece information $MP_1$-$MP_n$ can be displayed on the graphic display unit according to a command entered by the user. Alternatively, if the music title information $N_1$-$N_n$ are represented by voice sound information, then the user may output the music title information $N_1$-$N_n$ as voice sounds through a voice sound output unit or the like. Therefore, the user can output and display a list of music titles from the information storage medium 102, and select and play back a desired music piece based on the displayed list, even without a printed list of the titles of music. The music piece information $MP_1$-$MP_n$ contain the respective mark information $A_1$-$A_n$ at their leading ends and the respective accompaniment information $B_1$-$B_n$ subsequent to the mark information $A_1$-$A_n$. Therefore, the graphic display unit displays music titles, numbers allotted to the respective music titles, and so on. While viewing the image displayed on the graphic display unit, the user looks for a desired music piece, and selects the number thereof. An information reproducing apparatus, such as a CD player, for playing back the information storage medium, searches for the mark information corresponding to the selected number at high speed, and starts playing back the music piece information from the position corresponding to the mark information, thereby reproducing the accompaniment information of the desired music piece.

Fourth Embodiment

Figure 4:
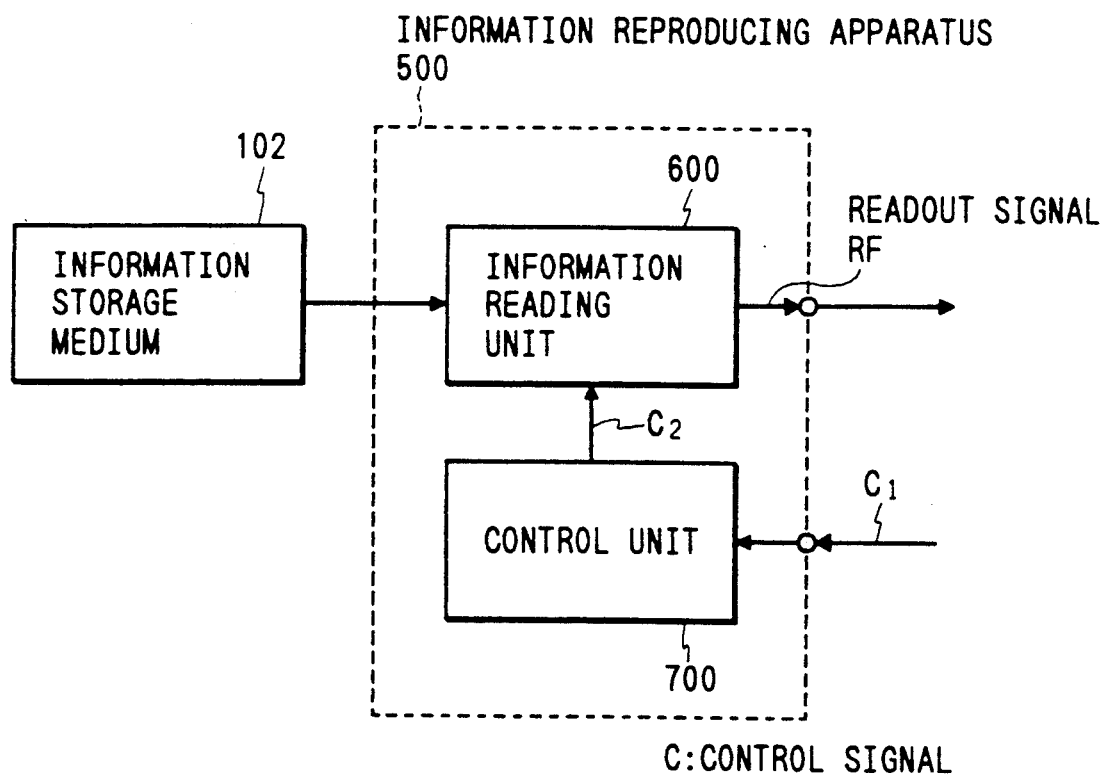
FIG. 4 is a diagram of a fourth embodiment of the present invention.

FIG. 4 schematically shows a fourth embodiment of the present invention.

As shown in FIG. 4, the information recorded in the information storage medium 102 can be reproduced by an information reproducting apparatus 500 which comprises an information reading unit 600 and a control unit 700.

In the information reproducing apparatus 500 shown in FIG. 4, the information reading unit 600 reads the recorded information from the information storage medium 102, and outputs a readout signal RF representing the read information. The control unit 700 operates in response to an external control signal $C_1$ or according to a program stored therein to issue a control signal $C_2$ to control the information reading unit 600 so as to retrieve, select, and read any one of the music piece information $MP_1$-$MP_n$ stored in the information storage medium 102, using the mark information $A_1$-$A_n$. Consequently, the information reading unit 600 outputs, as a readout signal RF, the digital contents information table 402 and the music title information $N_1$-$N_n$ contained therein. If the music title information $N_1$-$N_n$ are represented in the form of an image signal, for example, then the user selects a desired music piece on a graphic display, using the digital contents information table 402 as a list of music titles, by applying a control signal $C_1$ to the control unit 700. The control unit 700 then searches for the mark information $A_i$ corresponding to the selected desired music piece, and outputs a control signal $C_2$ to the information reading unit 600 to move the information reading unit 600 to an addressed position indicated by the mark information $A_i$. In response to the control signal $C_2$, the information reading unit 600 moves to the desired addressed position, and starts playing back the information storage medium 103 from the address indicated by the mark information $A_i$ corresponding to the desired accompaniment information $B_i$, thus reproducing the accompaniment information which represents the desired music piece.

Fifth Embodiment

Figure 5:
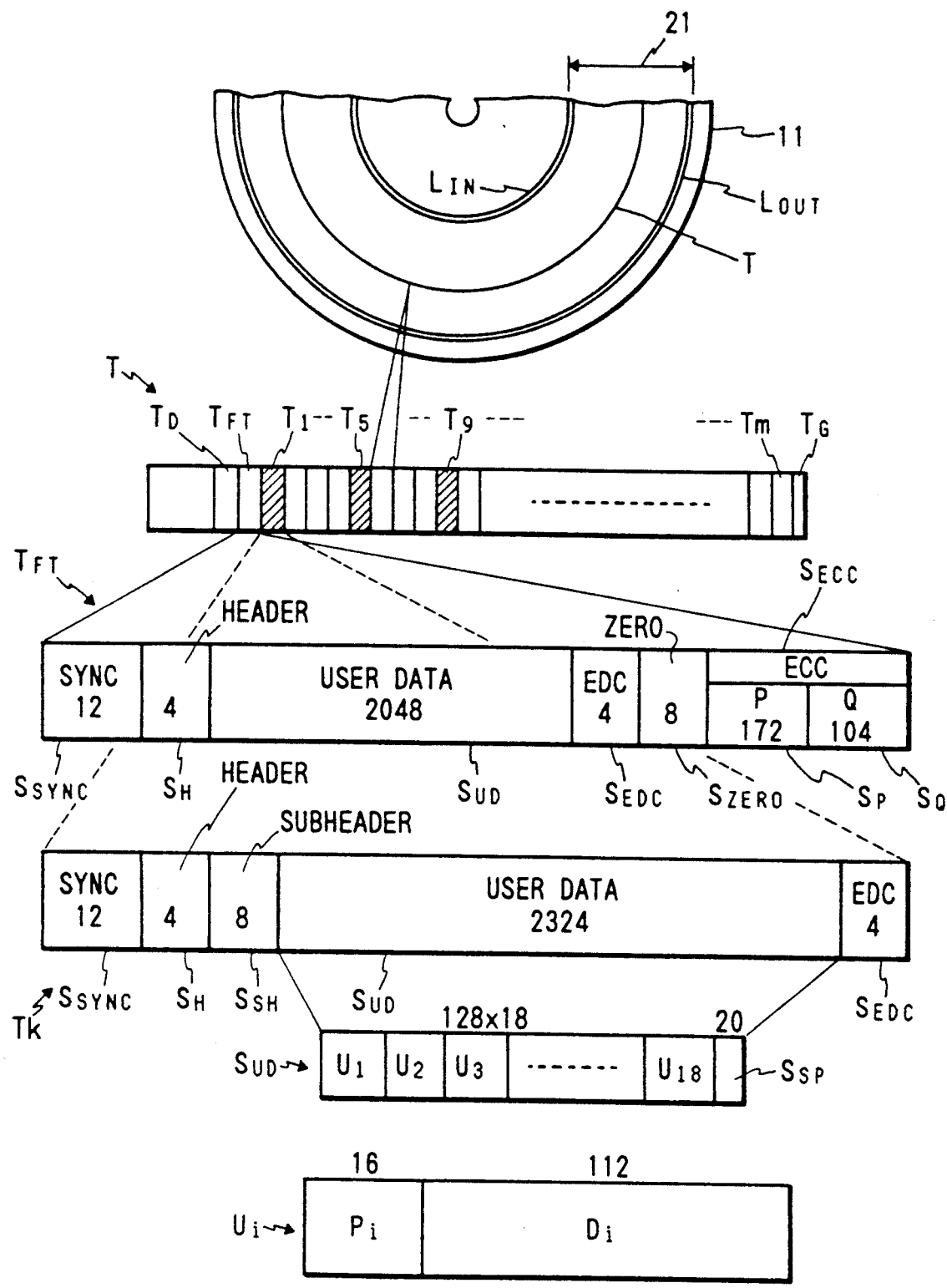
FIG. 5 is a diagram showing a fifth embodiment of the present invention.

FIG. 5 shows a data structure of an information storage medium used in a fifth embodiment of the present invention, the information storage medium being in the form of a CD-ROMXA disk.

A CD-ROM is an information storage medium that employs a compact disk (CD), which has been widely used as a digital audio disk, as a ROM (read-only memory) for only reading stored digital information. Standards for CD-ROMs were established in 1985. CD-ROMs are finding widespread use in various applications, and are advantageous in that they provide a very large storage capacity, are highly reliable as they operate optically, can access desired information quickly, are available in a large number of duplicates, and can establish an inexpensive reproduction system.

Information storage mediums which employ a format based on the CD-ROM include a CD-I (CD-Interactive) and a CD-ROMXA. Both can record and reproduce voice sound/audio information and image information, which are modulated according to ADPCM (Adaptive Differential Pulse Code Modulation) (see Nikkei Electronics, May 15, 1989, pages 195 -200).

The data/sector structure of a storage area in a CD-ROMXA is illustrated in FIG. 5.

According to the CD signal format, 98 frames of subcodes are handled as one block, and one block corresponds to 1/75 second. Since $$44.1 \times 10^3 \times 16 \times 2 \times 1/75 \times \tfrac{1}{8} = 2352,$$

data represented by 2352 bytes can be recorded in one block on a CD. In the above equation, $44.1 \times 10^3$ indicates a sampling frequency, 16 a quantizing number, 2 left and right channels (L and R) of a stereophonic system, 1/75 time (second), and $\tfrac{1}{8}$ a conversion rate between bits and bytes.

On the CD-ROMXA disk, each block is referred to as a sector, user data are recorded in each sector. There are two standards, Mode 1 and Mode 2 for CD-ROMXA disks depending on the size of the user data area, etc., and there are two standards, Form 1 and Form 2 for Mode 2.

As shown in FIG. 5, the CD-ROMXA disk, designated by 11, has lead-in tracks $L_{IN}$, a storage area 21, and lead-out tracks $L_{OUT}$. In the storage area 21, each track T has a volume descriptor $T_D$, sectors $T_1$-$T_m$, and a gap $T_G$. The volume descriptor $T_D$ is an area for storing an identification code indicating the CD-ROMXA disk, a flag, a startup directory, etc., and is recorded in Mode 1 or Mode 2 Form 1. The sectors $T_1$-$T_m$ (e.g., $T_k$) store image and voice sound or audio signals, and are recorded in Mode 2 Form 2, and each contain a synchronizing signal $S_{SYNC}$, a header $S_H$, a subheader $S_{SH}$, user data $S_{UD}$, and an error detecting code $S_{EDC}$. The synchronizing signal $S_{SYNC}$ is composed of 12 bytes, and serves to distinguish the sectors. The header $S_H$ is composed of 4 bytes, three for storing address information similar to the subcodes for CDs, and one for storing mode information. The subheader $S_{SH}$ is composed of 8 bytes, and includes a final number $H_1$, a channel number $H_2$, a submode $H_3$, and a coding formation $H_4$. Each of these items $H_1$-$H_4$ is composed of 1 byte, and is written twice (i.e., repeated twice).

The user data $S_{UD}$ is composed of 2324 bytes and has data units $U_1$-$U_n$ and a spare unit $U_{SP}$. In FIG. 5, each of the data units $U_1$-$U_n$ is composed of 128 bytes, and the spare unit $U_{SP}$ is composed of 20 bytes. Therefore, the number of data units "n" is 18 in the illustrated embodiment. The data units $U_1$-$U_n$ are composed of a total of 2304 bytes. The voice sound and audio signals are encoded by ADPCM and recorded in these data units. The error detecting code $S_{EDC}$ is composed of 4 bytes.

Figure 6:
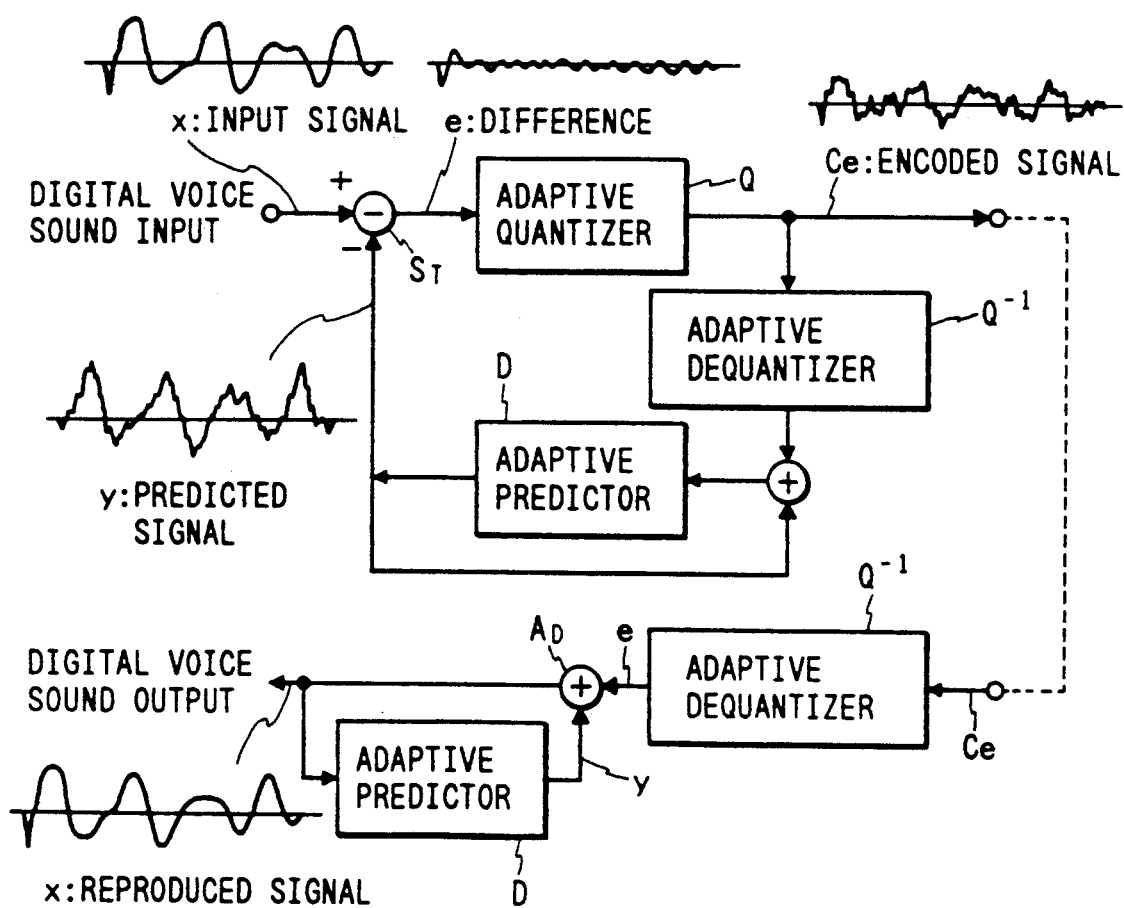
FIG. 6 is a block diagram illustrative of an ADPCM system.

FIG. 6 shows the principles of an ADPCM system. A modulation is carried out as follows. A present input signal is predicted from a past input signal by an adaptive predictor D, and the difference e ($=x-y$) between the predicted signal y and a present input signal x is calculated by a subtractor $S_T$. Then, the difference e is quantized with a plurality of bits and encoded into a coded signal $C_e$ by an adaptive quantizer Q. A demodulation process is carried out in a manner which is the reversal of the above mentioned process. More specifically, the coded signal $C_e$ is decoded back to the difference e by an adaptive dequantizer $Q^{-1}$. Then, the predicted signal y from the adaptive predictor D and the difference e are added into an output signal x by an adder $A_D$.

The ADPCM system allows audio data to be recorded efficiently with a smaller number of bits. Audio characteristics vary depending on the bit reduction ratio (data compression ratio). FIG. 7 shows the relationship between ADPCM sound quality levels and audio characteristics. It can be seen from FIG. 7 that the bit reduction ratio in the sound quality level A is $\tfrac{1}{2}$ for stereophonic reproduction and $\tfrac{1}{4}$ for monaural reproduction, the bit reduction ratio in the sound quality level B is $\tfrac{1}{4}$ for stereophonic reproduction and $\tfrac{1}{8}$ for monaural reproduction, and the bit reduction ratio in the sound quality level C is $\tfrac{1}{8}$ for stereophonic reproduction and 1/16 for monaural reproduction. If the bit reduction ratio is $\tfrac{1}{4}$, then the required storage capacity may be $\tfrac{1}{4}$ of the conventional storage capacity, and the remaining $\tfrac{3}{4}$ storage capacity may be used to store other data.

In FIG. 5, each data unit $U_i$ is composed of 128 bytes, and has a sound parameter area $P_i$ and an ADPCM sample data area $D_i$. The sound parameter area $P_i$ has a storage capacity of 16 bytes, and stores a coefficient of a predictive filter in the adaptive predictor D shown in FIG. 6. The ADPCM sample data area $D_i$ has a storage capacity of 112 bytes, and stores data sampled by the ADPCM system. Therefore, one sector has an overall data storage capacity of 2016 bytes ($=112 \times 18$). If data are to be stored in the ADPCM sound quality level B for stereophonic reproduction, then 504 bytes will be required to store the data because $$37.8 \times 10^3 \times 4 \times 2 \times 1/75 \times \tfrac{1}{8} = 504.$$

Therefore, since $2016 \div 504 = 4$, data which are four times greater than the data possible with the conventional storage system can be stored. Stated otherwise, voice sound and audio signals for four channels can be stored. The first channel is stored in the sectors $T_1$, $T_5$, $T_9$, ..., $T_{4h+1}$ (h is an integer of 0 or more). The second channel is stored in sections $T_2$, $T_6$, $T_{10}$, ..., $T_{4h+2}$. The third channel is stored in sections $T_3$, $T_7$, $T_{11}$, ..., $T_{4h+3}$. The fourth channel is stored in sectors $T_4$, $T_8$, $T_{12}$, ..., $T_{4h+4}$.

In this manner, musical accompaniments of karaoke music pieces, which correspond to the music piece information, are pulse-code-modulated and stored in the ADPCM sample data area $D_i$. The synchronizing signal $S_{SYNC}$, the header $S_H$, the subheader $S_{SH}$, etc. correspond to the mark information.

A file information table (hereinafter referred to as a "FILE-TOC"), which corresponds to the digital contents information table, can be stored in the user data area $S_{UD}$. The FILE-TOC is stored in a sector $T_{FT}$ which, as shown in FIG. 5, comprises one or more sectors following the volume descriptor $T_D$. The FILE-TOC may be stored in Mode 1 or Mode 2 Form 1, but is stored in Mode 1 in the illustrated embodiment. More specifically, if one sector is used, then the available storage capacity for storing the FILE-TOC is 2048 bytes as shown in FIG. 5. If N sectors are used, then the available storage capacity is $2048 \times N$ bytes. In Mode 1, the sector $T_{FT}$ has no subheader, and instead has a ZERO area $S_{ZERO}$ and an error correcting code area $S_{ECC}$. The ZERO area $S_{ZERO}$ is composed of 8 bytes and reserved. The error correcting code area $S_{ECC}$ is composed of 276 bytes, and has a parity P area $S_P$ (172 bytes) and a parity Q area $S_Q$ (104 bytes).

Figure 8A:
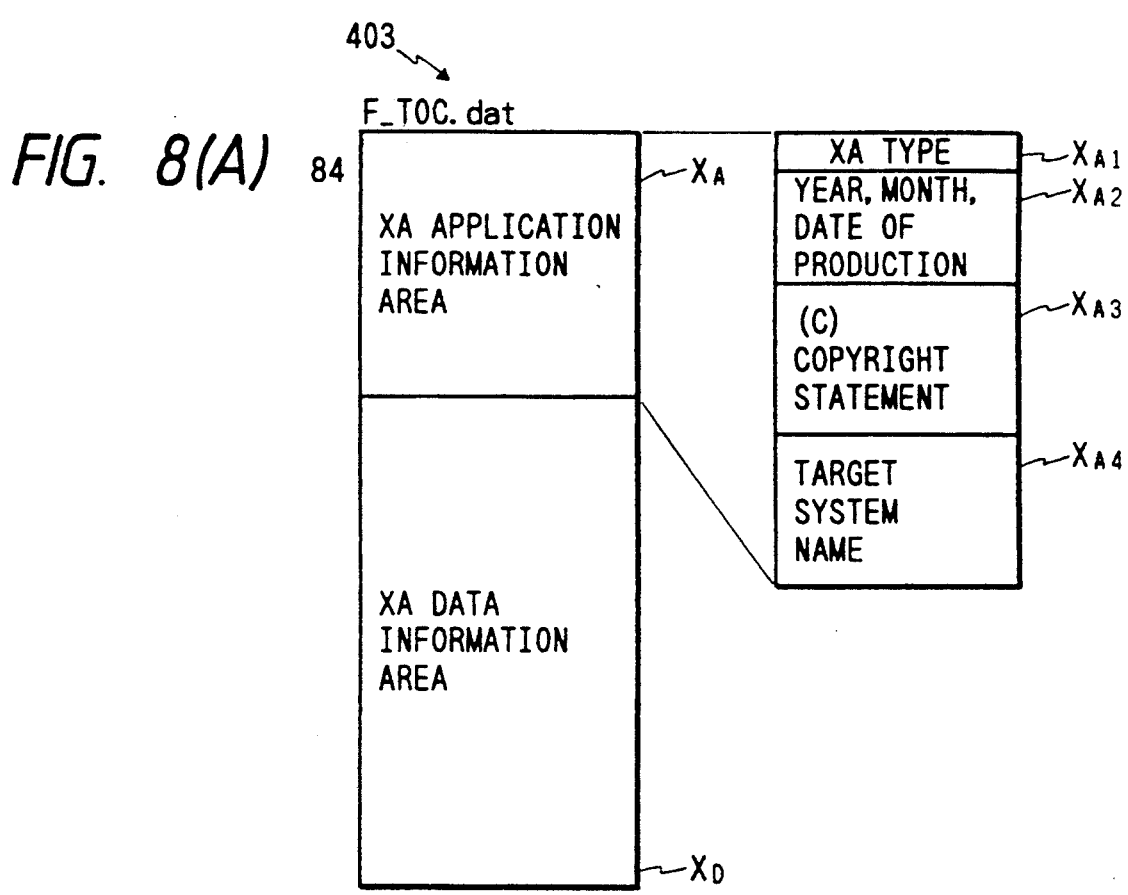
FIGS. 8(A), 8(B), and 8(C) are diagrams showing a data structure of a file information table (FILE-TOC), respectively.
Figure 8B:
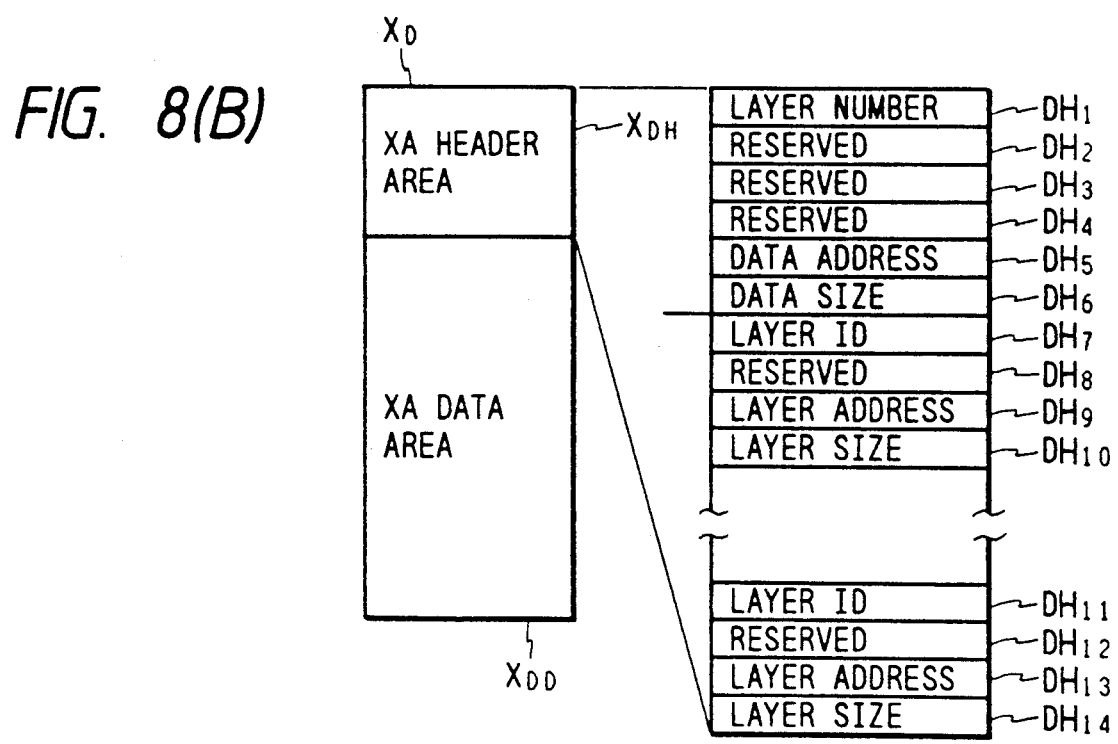
Figure 8C:
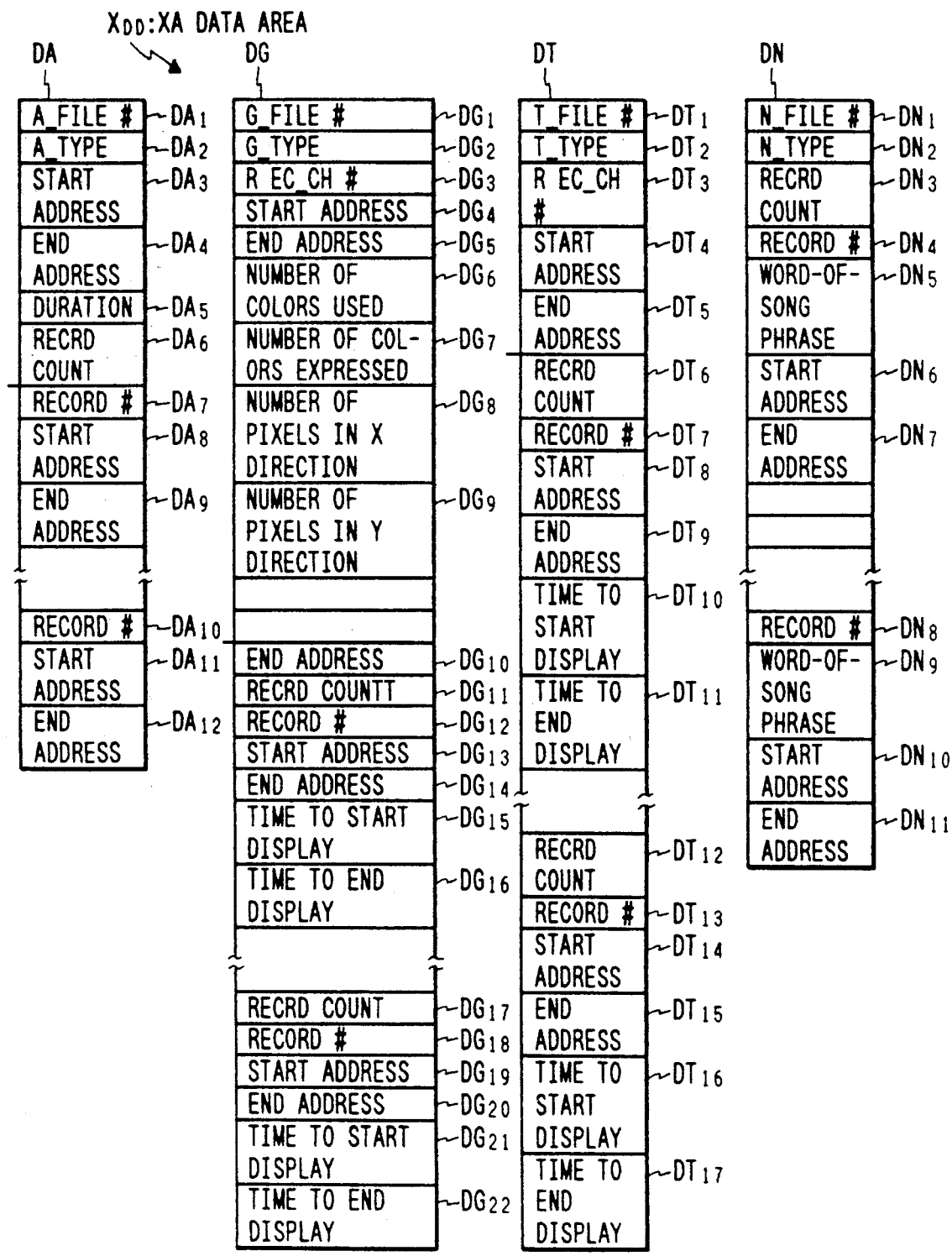

FIGS. 8(A), 8(B), and 8(C) show an example of a FILE-TOC, generally designated by 403. The FILE-TOC 403 is stored in one sector, and has an XA application information area $X_A$ and an XA data information area $X_D$. The XA application information area $X_A$ is composed of 84 bytes and serves to store information regarding the contents of the disk. The XA application information area $X_A$ includes a part $X_{A1}$, a part $X_{A2}$, a part $X_{A3}$, and a part $X_{A4}$. The part $X_{A1}$ is composed of 4 bytes, and stores the type of the CD-ROMXA disk, e.g., a type for storing only musical accompaniments of karaoke, a type for storing musical accompaniments and image information, etc. The part $X_{A2}$ is composed of 16 bytes, and stores the year, month, and date when the CD-ROMXA disk is produced. The part $X_{A3}$ is composed of 32 bytes, and stores information concerning the copyright of the CD-ROMXA disk. The part $X_{A4}$ is composed of 32 bytes, and stores information about the corresponding target system. The XA data information area $X_D$ is composed of 2240 bytes and has an XA header area $X_{DH}$ and an XA data area $X_{DD}$. The XA header area $X_{DH}$ serves to store information about the XA data area, specifically, a layer number $DH_1$, a data address $DH_5$, a data size $DH_6$, a layer ID $DH_7$, a layer address $DH_9$, a layer size $DH_{10}$, and other information. The XA data area $X_{DD}$ serves to store various information data, i.e., the digital contents information. More specifically, the XA data area $X_{DD}$ has an audio data area DA, a graphic data area DG, a telop (superimposed character) data area DT, and a music title data area DN. If musical accompaniments are stored as music piece information, then the digital contents information is stored mainly in the audio data area DA. Music titles indicated by music title information are stored in the music title data area DN. If music title data are character code information such as JIS code data, then they are usually stored in units of 8 bits (1 byte). If music title data are voice sound data representing music titles with voice sounds, then they are compressed and stored according to an ADPCM system (e.g., recorded in the level C for monaural reproduction).

Sixth Embodiment

Figure 9:
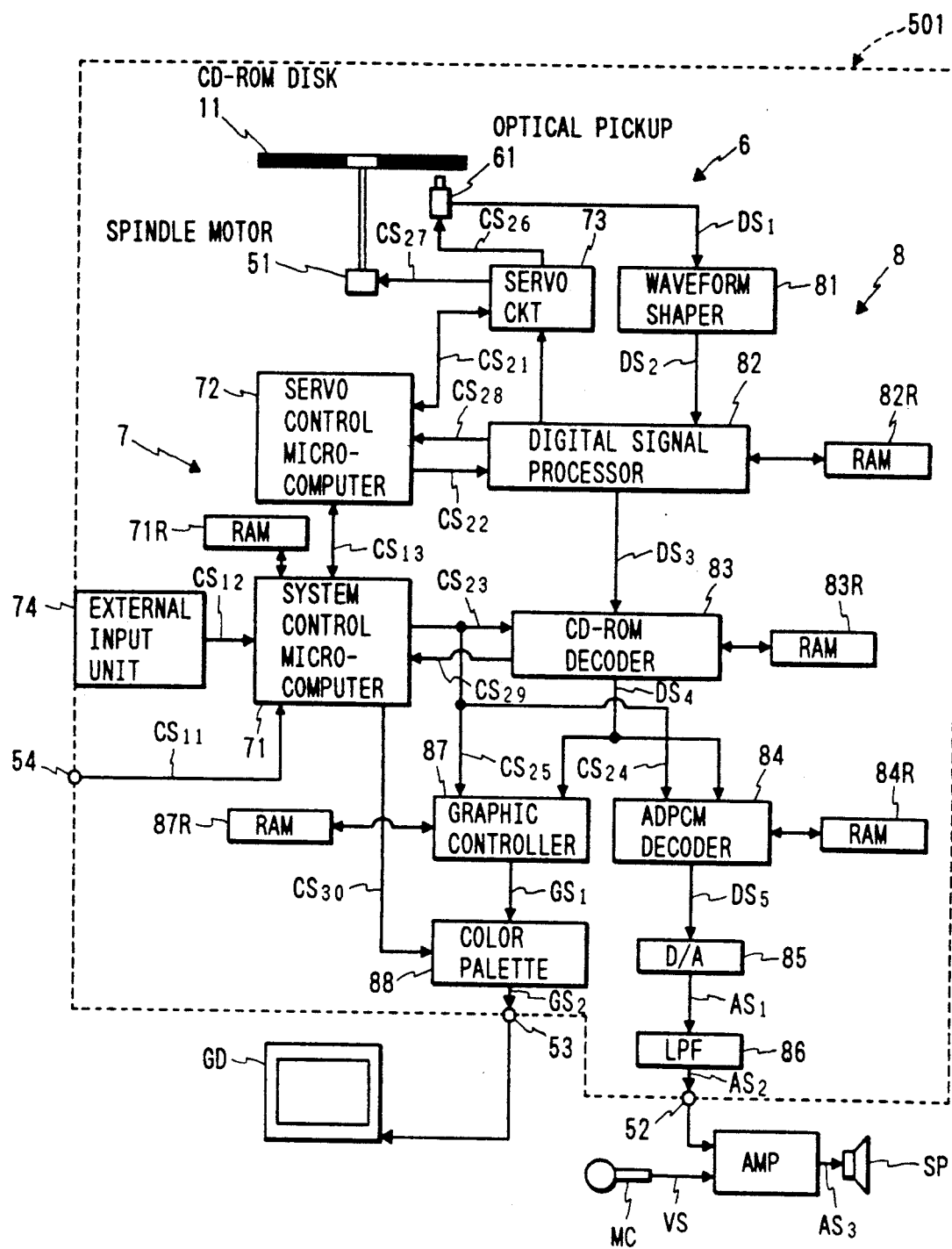
FIG. 9 is a block diagram showing a sixth embodiment of the present invention.

FIG. 9 shows in block form an apparatus for reproducing information as a sixth embodiment of this invention. The information reproducting apparatus shown in FIG. 9 is incorporated in a karaoke or musical accompaniment playback apparatus 501.

As shown in FIG. 9, the musical accompaniment playback apparatus 501 comprises an optical pickup 61 as a means for reading information, a control block 7 as a control means, a spindle motor 51, a demodulator block 8, and external terminals 52, 53, 54.

The control block 7 comprises a system control microcomputer 71, a RAM (Random Access Memory) 71R, a servo control microcomputer 72, a servo circuit 73, and an external input unit 74.

The demodulator block 8 has a waveform shaper 81, a digital signal processor 82, a RAM 82R, a CD-ROM decoder 83, a RAM 83R, an ADPCM decoder 84, a RAM 84R, a D/A converter 85, a low-pass filter 86, a graphic controller 87, a RAM 87R, and a color palette 88.

An external amplifier AMP may be connected to the external terminal 52, and an external microphone MC and an external loudspeaker SP may be connected to the external amplifier AMP.

A graphic display unit GD may be connected to the external terminal 53. An external control unit such as a microcomputer may be coupled to the external terminal 54.

The musical accompaniment playback apparatus 501 operates as follows:

A CD-ROM disk 11 is rotated about its own axis by the spindle motor 51. The optical pickup 61 reads a digital signal represented by a sequence of pits from the recording surface of the CD-ROM disk 11. The digital signal, designated by $DS_1$, read by the optical pickup 61 is supplied to the waveform shaper 81 by which the waveform of the digital signal is shaped. The shaped digital signal is then applied as a digital signal $DS_2$ to the digital signal processor 82. In the digital signal processor 82, the edges of an EFM signal are detected, using a reference clock signal generated by a quartz crystal oscillator, thereby reproducing a sequence of data. From the reproduced sequence of data, there is detected a frame synchronizing signal, based on which the structure of frame data is exactly reproduced. The frame data are converted into 8-bit symbol data by EFM demodulation, and written into the RAM 82R. The data stored in the RAM 82R is then deinterleaved. Thereafter, an error correcting process is effected on the data. The corrected data are then sent as a signal $DS_3$ from the digital signal processor 82 to the CD-ROM decoder 83. In the CD-ROM decoder 83, addresses are sought according to the absolute time of the subcode, synchronizing signals in the data are detected, and the data are unscrambled. Then, the header address is checked, and a desired sector is accessed. The user data which are obtained are subjected to error detection and correction processes, after which the corrected data are supplied as a signal $DS_4$ to the ADPCM decoder 84.

The ADPCM decoder 84 has an adaptive dequantizer and an adaptive predictor (not shown), and demodulates the signal $DS_4$ into a digital signal and supplies the demodulated signal as a signal $DS_5$ to the D/A converter 85.

The D/A converter 85 converts the demodulated signal $DS_5$ into an analog signal, and sends the analog signal as a signal $AS_1$ to the low-pass filter 86. The low-pass filter 86 processes the signal $AS_1$ into an accurate signal $AS_2$ and applies the signal $AS_2$ to the external terminal 52.

The analog signal $AS_2$, which is an audio output signal from the musical accompaniment playback apparatus 502, is applied to the external amplifier AMP. Voice sounds applied to the external microphone MC are converted thereby into a microphone voice signal VS. The external amplifier AMP adjusts the frequency characteristics of the analog signal $AS_2$ and also mixes the analog signal $AS_2$ with the microphone voice signal VS. Then, the external amplifier AMP amplifies the mixed signal to a suitable level, and then sends the amplified signal as a signal $AS_3$ to the external loudspeaker SP. The external loudspeaker SP converts the signal $AS_3$ into audible sounds which are radiated from the external loudspeaker SP.

The signal $DS_4$, outputted from the CD-ROM decoder 83, is also transmitted to the graphic controller 87. In cases where image information is stored in the user data $S_{UD}$ of the CD-ROM disk 11, the graphic controller 87 extracts an image signal representing the image information contained in the signal $DS_4$, and outputs the extracted image signal as a graphic signal $GS_1$. For example, the graphic controller 87 produces such a graphic signal if the pieces $N_1$–$N_n$ of music title information stored in the FILE-TOC 403 of the CD-ROM disk 11 are character code information representing music titles. The graphic signal $GS_1$ is then supplied to the color palette 88. The color palette 88 adjusts or adds the color represented by the graphic signal $GS_1$, and outputs it as a graphic signal $GS_2$ to the external terminal 53. The graphic signal $GS_2$, which is an image output signal from the musical accompaniment playback apparatus 501, is applied to the graphic display unit GD. The graphic display unit GD displays an image represented by the graphic signal $GS_2$.

The system control microcomputer 71 applies a control signal $CS_{13}$ to the servo control microcomputer 72 according to control signal $CS_{12}$ supplied from the external input unit 74, a control signal $CS_{11}$ supplied from the external terminal 54, or a control program stored in the system control microcomputer 71. The system control microcomputer 71 also controls the CD-ROM decoder 83, the ADPCM decoder 84, the graphic controller 87, and the color palette 88 with respective control signals $CS_{23}$, $CS_{24}$, $CS_{25}$, $CS_{30}$. The system control microcomputer 71 receives FILE-TOC data as a control signal $CS_{29}$ from the CD-ROM decoder 83, and stores the data in the RAM 71R. The servo control microcomputer 72 receives the control signal $CS_{13}$ from the system control microcomputer 71, and also receives a subcode signal $CS_{28}$ from the digital signal processor 82. The servo control microcomputer 72 controls the digital signal processor 82 and the servo circuit 73 with respective control signals $CS_{22}$, $CS_{21}$. The servo circuit 73 is responsive to the control signal $CS_{21}$ from the servo control microcomputer 72 to control the optical pickup 61 and the spindle motor 51 with respective control signals $CS_{26}$, $CS_{27}$.

Operation of the musical accompaniment playback apparatus 501 which is loaded with the CD-ROM disk 11 will now be described below with reference to FIGS. 9, 10(A) through 10(D), 11, 12, and 13.

Figure 10A:
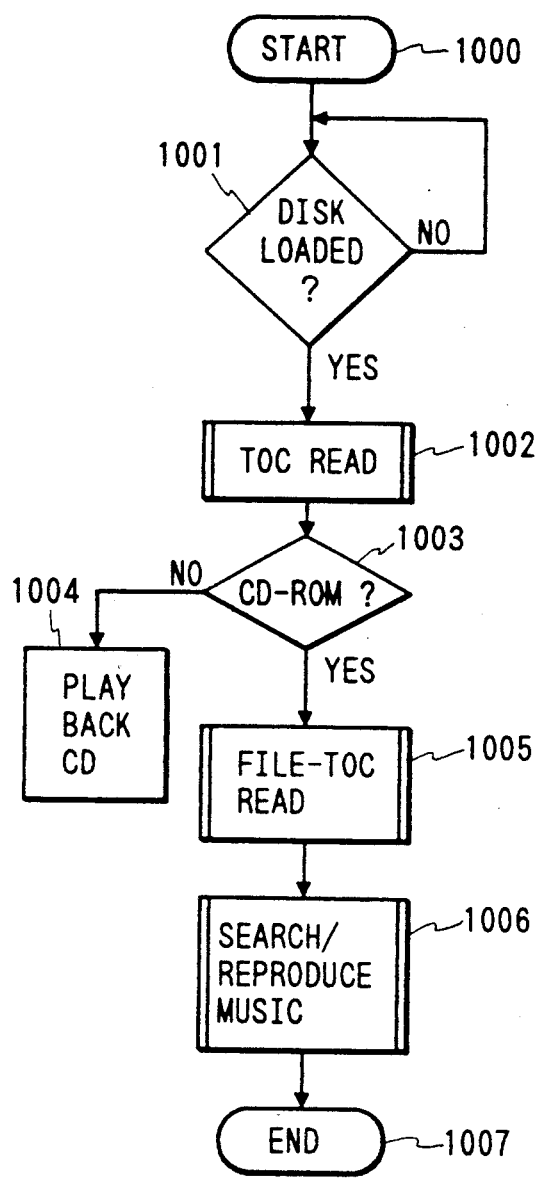

As shown in FIG. 10(A), the musical accompaniment playback apparatus 501 starts to operate at a step 1000, and then determines whether a disk is loaded or not in a step 1001. If a disk is loaded, then control goes from the step 1001 to a step 1002 which is a subroutine for reading a TOC stored in the lead-in tracks of the loaded disk. After the step 1002, at a step 1003 it is determined whether the loaded disk is an ordinary CD or a CD-ROM. If the loaded disk is an ordinary CD, then control goes to a step 1004 in which the CD is played back. If the loaded disk is a CD-ROM, then control proceeds to a step 1005 which is a subroutine for reading the FILE-TOC data from the FILE-TOC of the disk. After the step 1005, control goes to a step 1006 which is a subroutine for selecting and reproducing a desired music piece in a search/playback mode. The sequence shown in FIG. 10(A) ends at a step 1007.

Figure 10B:
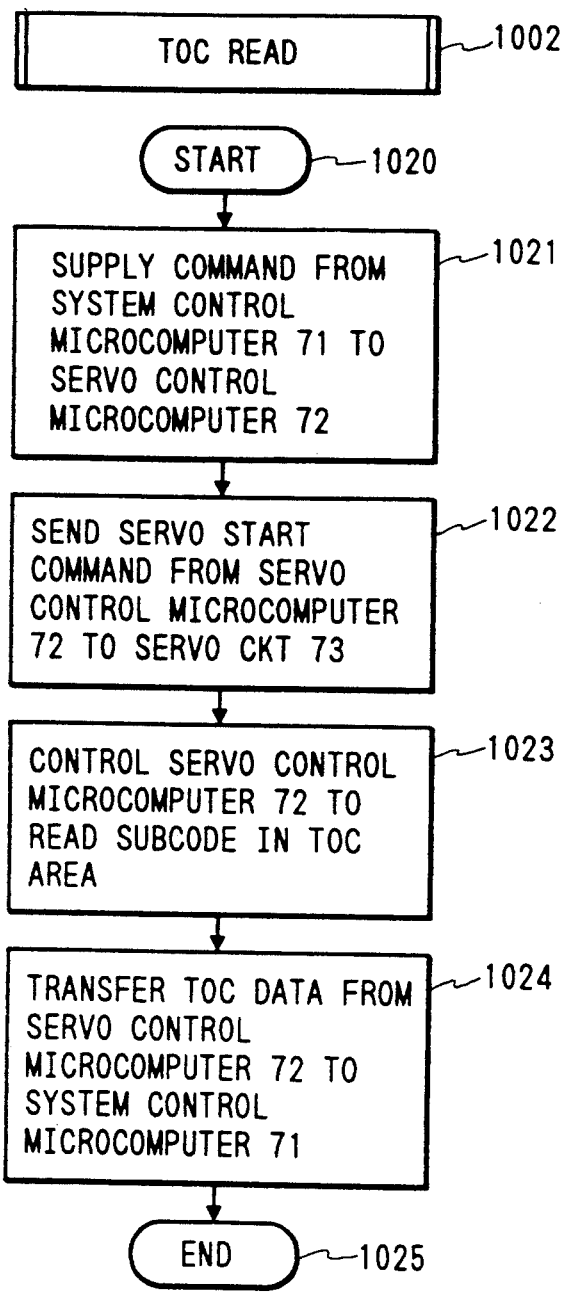

The subroutine in the step 1002 for reading the TOC is started in a step 1020 in FIG. 10(B). In a step 1021, a command signal is applied to the servo control microcomputer 72 from the system control microcomputer 71 to supply a servo operation start command from the servo control microcomputer 72 to the servo circuit 73 in s step 1022, thus controlling the optical pickup 61 for tracking under servo control. Then, the servo control microcomputer 72 reads subcodes in the TOC area on the lead-in tracks of the CD-ROM disk 11 in a step 1023. The TOC data are transferred from the servo control microcomputer 72 to the system control microcomputer 71 in a step 1024. The subroutine shown in FIG. 10(B) is finished in a step 1025.

The subroutine in the step 1005 for reading the FILE-TOC data is started in a step 1050 in FIG. 10(C). A search/reproduction command is applied to the servo control microcomputer 72 from the system control microcomputer 71 in a step 1051. Then, the servo control microcomputer 72 applies a search/reproduction command to the servo circuit 73 in a step 1052. The digital signal processor 82 transfers the FILE-TOC data to the CD-ROM decoder 83 in a step 1053. The CD-ROM decoder 83 decodes the FILE-TOC data, and the decoded FILE-TOC data is transferred from the CD-ROM decoder 83 to the system control microcomputer 71 in a step 1054. The transferred FILE-TOC data in the RAM 71R in a step 1055. The subroutine shown in FIG. 10(C) is brought to an end in a step 1056.

The subroutine in the step 1006 will be described below with reference to FIG. 10(D). After the subroutine is started in a step 1060, the FILE-TOC data stored in the RAM 71R is read, and transferred to the graphic controller 87 by the system control microcomputer 71 in a step 1061. Then, the transferred FILE-TOC data is sent to the graphic display unit GD through the graphic controller 87 and the color palette 88, whereupon the graphic display unit GD displays a list of music pieces to choose therefrom which is contained in the digital contents information table in a step 1062. The list of music pieces to choose from is shown by way of example in FIG. 11. The CD-ROM disk 11 stores n musical accompaniments or karaoke music pieces which are allotted serial numbers ranging from 1 to n in a column $L_1$ of the list. The list also has a column $L_2$ for displaying music titles in alphabetical order, for example, a column $L_3$ for displaying poets and composers, a column $L_4$ for displaying singers, and a column $L_5$ for displaying beginning word-of-song phrases (e.g., one line) of the music pieces. The data displayed in the columns $L_2$–$L_5$ of the list can be searched for with alphabetical letters. Then, the user selects a desired music piece in a step 1063.

Seventh Embodiment

Figure 12:
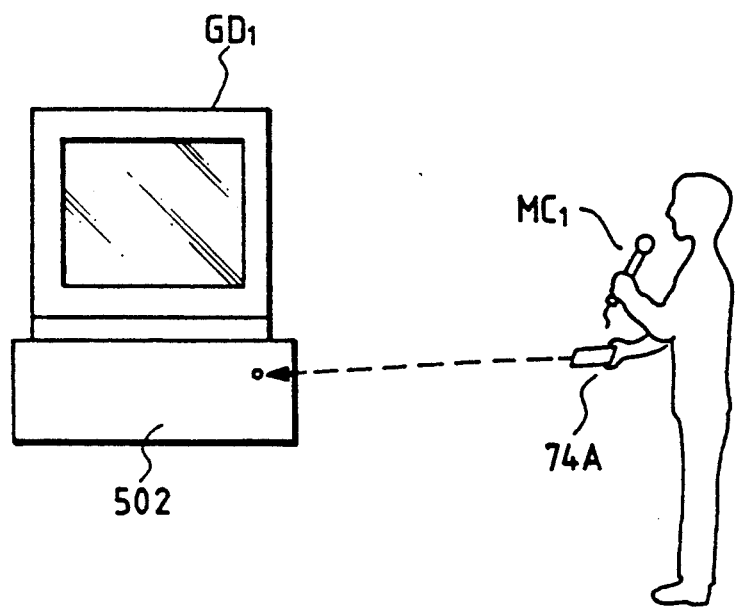
FIG. 12 is a view of a seventh embodiment of the present invention.

FIG. 12 shows a seventh embodiment, while viewing the list of music pieces to choose therefrom is displayed on the screen of the graphic display unit, designated by $GD_1$, the user controls an infrared remote control input unit 74A on hand to emit an infrared radiation to the musical accompaniment playback apparatus, designated by 502, as a seventh embodiment, to select the desired music piece. The user's vocal sounds are transmitted from a wireless microphone $MC_1$ to the musical accompaniment playback apparatus 502.

Eighth Embodiment

Figure 13:
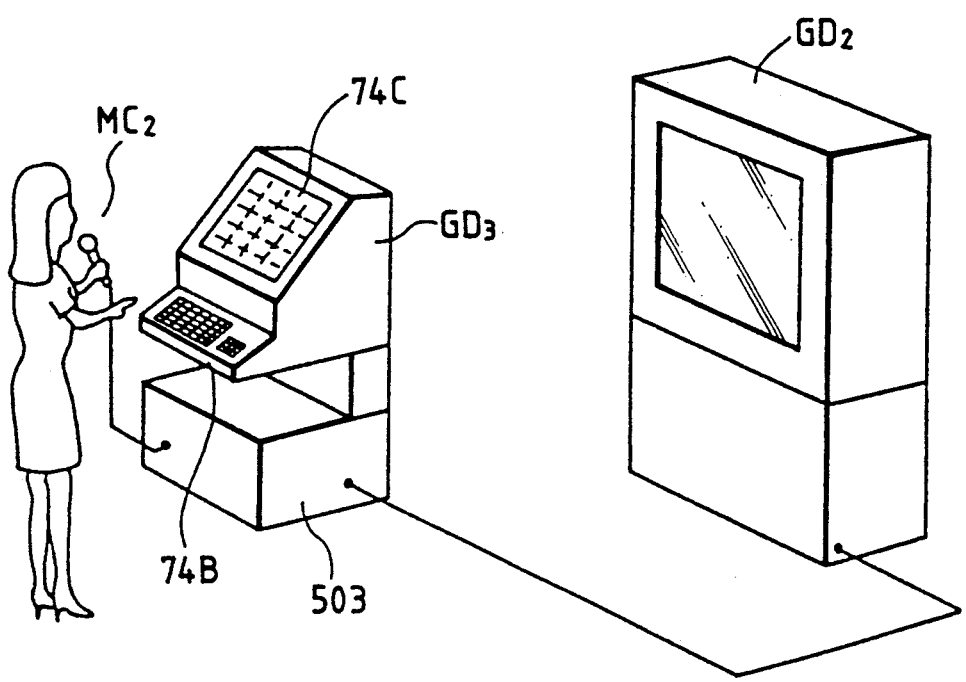
FIG. 13 is a view of an eighth embodiment of the present invention.

According to an eighth embodiment, as shown in FIG. 13, the user selects a desired music piece by entering a control command through a keyboard input unit 74B into the musical accompaniment playback apparatus, designated by 503, while viewing the list of music pieces to choose therefrom is displayed on the graphic display unit, designated by $GD_2$.

Ninth Embodiment

Alternatively, according to a ninth embodiment as shown in FIG. 13, the user may enter a control command representing a desired music piece through a transparent touch panel input unit 74C placed directly over the screen of another graphic display unit $GD_3$. The user's vocal sounds are transmitted through an external microphone $MC_2$ connected to the musical accompaniment playback apparatus 503.

In FIG. 10(D), if a music piece is selected, then a search/reproduction command is applied from the system control microcomputer 71 to the servo control microcomputer 72 in a step 1064. Then, the servo control microcomputer 72 applies a search/reproduction command to the servo circuit 73 in a step 1065. The digital signal processor 82 transfers reproduced data DS₃ to the CD-ROM decoder 83 in a step 1066. Thereafter, the system control microcomputer 71 transfers reproduced data DS₄, decoded by the CD-ROM decoder 83, to the ADPCM decoder 84 for the reproduction of the selected music piece in a step 1067. The sequence shown in FIG. 10(D) comes to an end in a step 1068.

In the above embodiment, the music piece information represents musical accompaniments known as karaoke music. However, the music piece information may be a collection of other digital audio information.

While the digital contents information in the above embodiment has been described as representing the music titles of musical accompaniments, the digital contents information may represent music poets, music composers, all words of songs, addresses of word-of-song phrases, years, months, and dates of music pieces, awards given to music pieces, etc.

The digital contents information or the music title information is represented by image information which is displayed on the graphic display unit in the illustrated embodiment. However, the digital contents information or the music title information may be expressed by voice sounds. In this case, the music title information is sent from the RAM 71R to the ADPCM decoder 84 by the system control microcomputer 71 in the step 1067 shown in FIG. 10(D), and converted into voice sounds by the external loudspeaker SP (FIG. 9). Upon listening to the reproduced voice sounds, the user can know music pieces and their numbers, and select a desired music piece.

The CD-ROMXA disk has been employed as the information storage medium in the above embodiment. However, the information storage medium may be any of various other forms including a CD-ROM, a CD-I, an ordinary CD, a DAT (digital audio tape), an IC card, and a read-only memory of another type.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A system for reproducing information from an optical disc, said apparatus comprising:
    an optical disc for storing a digital information contents table and a plurality of musical arrangements having mark information to identify each musical arrangement, said digital information contents table containing information corresponding to each of said plurality of musical arrangements, said optical disc comprising: a plurality of tracks, each track including a plurality of sectors such that each sector includes a plurality of user data storage areas for storing user data, said digital information contents table being stored in a first predetermined group of said plurality of user data storage areas in one sector of each of said plurality of tracks, and said plurality of musical arrangements being stored in a remainder of said plurality of user data storage areas in each of said plurality of tracks;
    information reading means for reading said optical disc;
    decoding means for decoding an output signal from said information reading means;
    graphic controller means for extracting image information, including said digital information contents table, from an output of said decoding means, said graphic controller means generating a graphic output signal;
    information display means for displaying said digital information contents table; and
    demodulation means for demodulating said output signal from said decoding means and for outputting a corresponding digital signal representing a selected musical arrangement to be reproduced.

2. The system according to claim 1, wherein the digital contents information table includes music title information which represents the titles corresponding to each of said plurality of musical arrangements.

3. The system according to claim 1, further comprising selecting means for selecting one of the musical arrangements indicated in the displayed digital information contents table.

4. The system according to claim 1, wherein said digital information contents table includes numbers for specifying each of said musical arrangements and said number corresponds to each of said mark information.

5. A system for reproducing information from an optical disc, said apparatus comprising:
    an optical disc for storing a digital information contents table and a plurality of musical arrangements having mark information to identify each musical arrangement, said digital information contents table containing information corresponding to said plurality of musical arrangements, said optical disc including a plurality of storage areas arranged such that said digital information contents table is stored in a first predetermined group of storage areas and said musical arrangements are stored in a second predetermined group of storage areas;
    information reading means for reading said optical disc;
    decoding means for accessing a signal representing user data read by said information reading means, said user data including said digital information contents table and a desired musical arrangement;
    graphic controller means for extracting image information, including said digital information contents table, from an output of said decoding means, said graphic controller means generating a graphic output signal;
    information display means for displaying said digital information contents table; and
    demodulation means for demodulating said signal corresponding to said user data and for outputting a corresponding digital signal representing a selected musical arrangement to be reproduced.

6. The system according to claim 5, wherein said information display means includes a cathode ray tube.

7. The system according to claim 5, wherein said command input means includes a transparent touch panel type input unit.

8. The system according to claim 5, wherein the digital contents information table includes music title information which represents the titles corresponding to each of said plurality of musical arrangements.

9. The system according to claim 5, wherein voice sound information corresponding to information contained in said digital information contents table is stored in said first predetermined group of storage areas.

10. The system according to claim 5, further comprising a selecting means for selecting one of the musical arrangements indicated in the displayed digital information contents table.

11. The system according to claim 5, wherein said digital information contents table includes numbers for specifying each of said musical arrangements and said number corresponds to each of said mark information.

* * * * *